(12) United States Patent
Titley

(10) Patent No.: US 11,017,243 B2
(45) Date of Patent: May 25, 2021

(54) AUTOMOTIVE SYSTEM WITH MOTION DETECTION CAPABILITIES

(71) Applicant: Intel Corporation, Santa Clara, CA (US)

(72) Inventor: Adam Titley, Bracknell (GB)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 15/369,716

(22) Filed: Dec. 5, 2016

(65) Prior Publication Data
US 2018/0157919 A1 Jun. 7, 2018

(51) Int. Cl.
*H04N 7/18* (2006.01)
*G06T 7/254* (2017.01)
*G06K 9/00* (2006.01)
*B60R 11/04* (2006.01)

(52) U.S. Cl.
CPC .......... *G06K 9/00805* (2013.01); *B60R 11/04* (2013.01); *G06T 7/254* (2017.01); *H04N 7/183* (2013.01); *G06T 2207/20024* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 3,120,992 A | 2/1964 | Hollingsworth | |
| 5,809,161 A | 9/1998 | Auty et al. | |
| 6,628,804 B1 | 9/2003 | Edanami | |
| 7,231,288 B2 | 6/2007 | Koulinitch | |
| 7,676,324 B2 | 3/2010 | Bae | |
| 8,934,023 B2 | 1/2015 | Webb et al. | |
| 2004/0016870 A1* | 1/2004 | Pawlicki | B60W 50/14 250/208.1 |
| 2007/0206945 A1* | 9/2007 | DeLorme | G03B 41/00 396/332 |

(Continued)

FOREIGN PATENT DOCUMENTS

| | | |
|---|---|---|
| CN | 104276121 A | 1/2015 |
| CN | 104838644 A | 8/2015 |

(Continued)

OTHER PUBLICATIONS

Office Action dated Mar. 16, 2021 issued for Chinese Patent Application No. 201711266837.0.

*Primary Examiner* — Mikhail Itskovich
(74) *Attorney, Agent, or Firm* — Schiff Hardin LLP

(57) ABSTRACT

A car may be equipped with a camera for detecting the movement of objects in the vicinity of the car. The camera may be used to capture a series of images. A number of target sample points may be defined in each image. The position of the target sample points may corresponding to the driver's blind spot or other region(s) of interest. The camera may also include separate filters for generating a long term pixel intensity output and a short term pixel intensity output at each of the target sample points. These long and short term average outputs may be compared to determine if a large change in intensity has occurred over a short period of time. The order of target activation can then be used to determine the direction of vehicle motion while filtering out noise or other road markings.

20 Claims, 5 Drawing Sheets

(56) References Cited

U.S. PATENT DOCUMENTS

2012/0095628 A1 4/2012 Arvidsson
2016/0328629 A1* 11/2016 Sinclair ................ H04N 5/2253

FOREIGN PATENT DOCUMENTS

CN 108151714 A 6/2018
DE 102015202376 A1 8/2016
EP 3330923 A1 6/2018

* cited by examiner

AUTOMOTIVE SYSTEM WITH MOTION DETECTION CAPABILITIES

BACKGROUND

Cars typically include standard optical rearview mirrors attached near the hinge of the driver and passenger doors. These conventional rearview mirrors protrude from the body of the car and are prone to collision, especially in tight spots. Traditional rearview mirrors also have a blind spot where the driver cannot see oncoming cars due to the limited field of view of the rearview mirrors.

It is within this context that the embodiments described herein arise.

SUMMARY

This relates generally to an automotive system and, more particularly, to cars equipped with cameras for sensing motion in their vicinity. In accordance with an embodiment, a car may be provided with a camera that captures video frames. The camera may be a rearview camera, a front-view camera, or a side-view camera. An array of target sampling points may be selected in each of the video frames. The camera may measure the brightness level and/or color at each of the target sampling points in the array.

The camera may also include a long average filter circuit and a short average filter circuit. The long average filter circuit may filter the measured brightness level over a first number of frames to produce a long term average value, whereas the short average filter circuit may filter the measured brightness level over a second number of frames that is at least ten or a hundred times less than the first number of frames to produce a short term average value. The long term average value serves as a baseline measurement to detect noise and road/weather conditions, whereas the short term average value is compared with the baseline measurement to determine whether an external object is indeed approaching the car.

The camera may also be configured to analyze the sequence in which the array of target sampling points are activated. For example, the camera may determine the order in which rows in the array of target points are being activated/triggered. Depending on what sequence is being triggered, the camera can help detect for the presence of another vehicle in an adjacent lane, the presence of another vehicle directly behind the car, and can also sense the direction of another vehicle in front of the car. In response to determining that another vehicle is moving towards the camera in a potentially dangerous way, the camera may send an alert to the driver or can direct the car to take other suitable precautionary action to prevent collision.

Further features of the invention, its nature and various advantages will be more apparent from the accompanying drawings and following detailed description.

DETAILED DESCRIPTION

Embodiments of the present invention relate to motion sensing and, more particularly, to detecting motion in the vicinity of an automotive system. In particular, a car may be provided with a camera that includes a long average filter and a short average filter for filtering brightness measurements at selected target sampling points. The long average filter serves to output long term pixel intensity at the target points, whereas the short average filter serves to output short term pixel intensity at the target points. By comparing the short term pixel intensity with the long term pixel intensity, the camera will be capable of filtering out background noise and detecting the direction of an oncoming vehicle.

It will be recognized by one skilled in the art, that the present exemplary embodiments may be practiced without some or all of these specific details. In other instances, well-known operations have not been described in detail in order not to unnecessarily obscure the present embodiments.

Figure 1:
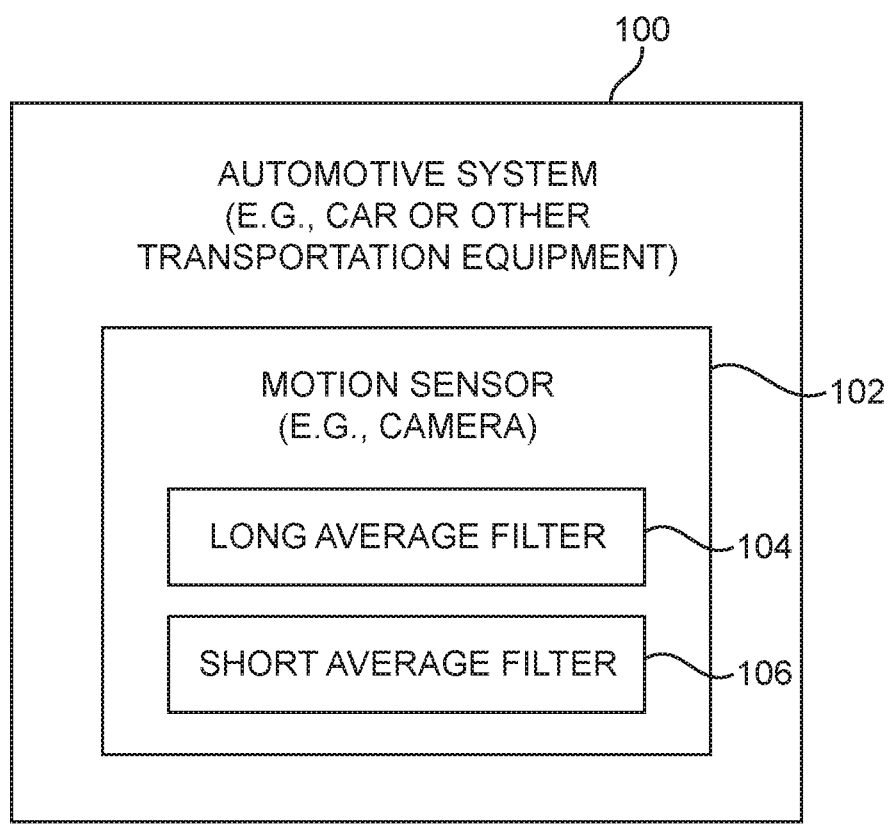
FIG. 1 is a diagram of an illustrative automotive system having a motion sensor in accordance with an embodiment.

FIG. 1 is a diagram of an illustrative automotive system such as system 100. Automotive system 100 may be a car, automobile, motorcar, motorboat, machine, or other transportation vehicle that is powered by an engine. As shown in FIG. 1, automotive system 100 may include a motion sensor such as motion sensor 102 (e.g., an ultrasonic sensor) for detecting moving objects in the vicinity of system 100. For example, motion sensor 102 may be a camera that captures video frames. By analyzing the change in the position of objects in the video frames, the camera may be used to detect whether an external object is moving towards or away from system 100.

In accordance with an embodiment, system 100 may include filtering circuits such as long average filter 104 and short average filter 106. Long average filter 104 and short average filter 106 may be infinite impulse response (IIR) filters for measuring the long term pixel intensity and the short term pixel intensity, respectively. In other words, long average filter 104 may output a brightness level that is averaged over a first (longer) duration, whereas short average filter 106 may output a brightness level that is averaged over a second duration that is shorter than the first duration. As an example, the long average filter may produce brightness values that are averaged over hundreds of frames. The short average filter may, on the other hand, produce brightness values that are average over only two to three frames (as an example). In general, the duration of the long term averaging may be at least ten times or at least a hundred times longer than the short term averaging.

Configured in this way, long average filter 104 may be used to filter out "slower" changes or noise in the background, such as changes in road markings, changes in road condition, changes in weather, and/or other non-critical environmental variations. On the other hand, short average filter 106 may be used to isolate "faster" changes in the vicinity of the car, such as when another vehicle is quickly approaching from behind, when another vehicle is quickly approaching from the side, when another vehicle is quickly approaching from the front, when another vehicle is quickly approaching the car from any suitable direction, or for detecting any motion relative to the car.

Figure 2:
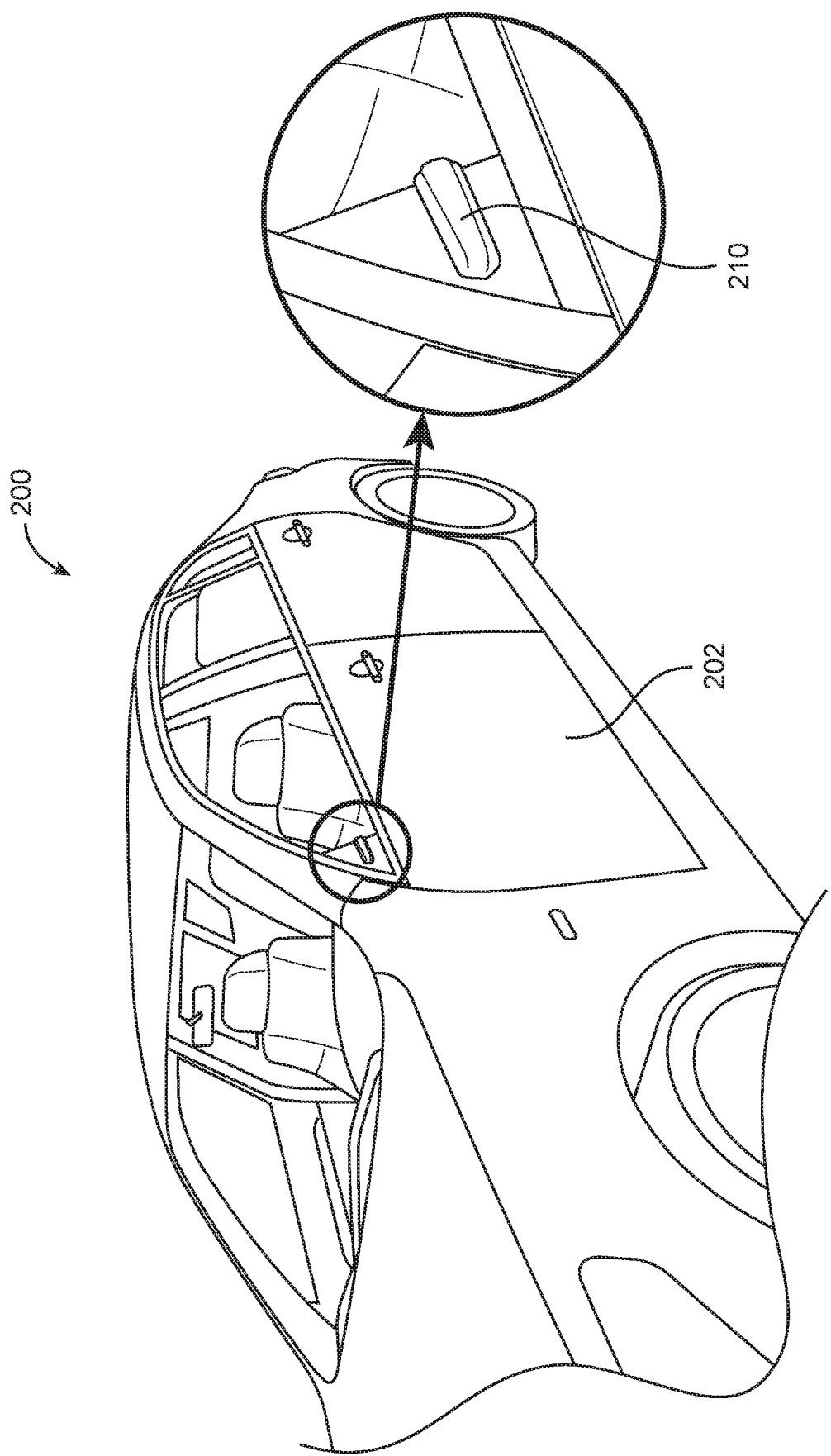
FIG. 2 is a perspective view of a car with an illustrative rearview camera in accordance with an embodiment.

FIG. 2 is a perspective view of a car with an illustrative rearview camera in accordance with an embodiment. Car 200 has a car door such as door 202, and as shown in the close-up view, rearview camera 210 may be mounted on door 202. Camera 210 that is mounted on car door 202 and facing towards the back of car 200 in the example of FIG. 2 is merely illustrative and does not serve to limit the scope of the present embodiments. If desired, camera 210 may be mounted on any other car door, on the trunk, on the engine hood facing forward, on the dashboard, on the front or back bumper, on the car door handles, on the housing of the car, or on any other suitable portion of car 200 facing any desired direction.

Figure 3:
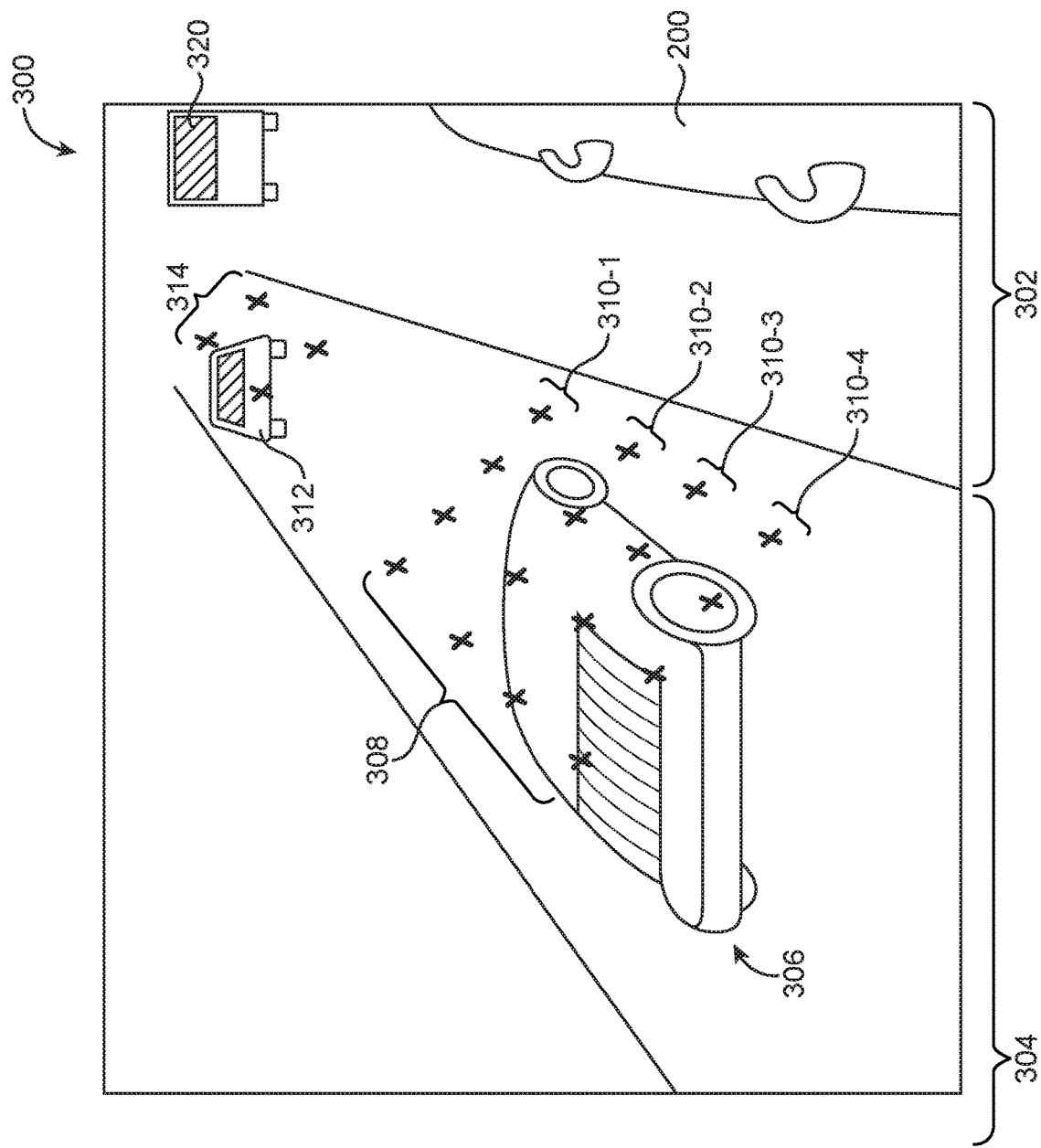
FIG. 3 is a diagram showing how a rearview camera can include multiple target points for detecting oncoming cars in an adjacent lane in accordance with an embodiment.

FIG. 3 is a diagram showing how a rearview camera can include multiple target sampling points for detecting oncoming cars in an adjacent lane in accordance with an embodiment. As shown in FIG. 3, the rearview camera is at least capable of capturing objects in a current lane 302 in which car 200 is presently driving on and also objects in an adjacent lane 304. In particular, each video frame 300 may include at least an array of target points 308 for detecting cars in adjacent lane 304. The position of target points 308 may be strategically selected such that it corresponds to the driver's "blind spot" in the context of the conventional optical rearview mirror or can be dynamically adjusted over time to adapt to changing conditions (e.g., to account for lane width variations, the current speed of the car, or other factors).

Array 308 may include a first row 310-1 of points, a second row 310-2 of points, a third row 310-3 of points, and a fourth row 310-4 of points. Brightness measurements can be taken at these target points. These measurements can then be filtered using the long average filter to identify the road conditions and also filtered using the short average filter to identify "fast" moving object like cars passing through adjacent lane 304.

For example, a car such as car 306 may be detected in adjacent lane 304. In one scenario, row 310-1 may sense the car entering the array, row 310-2 may then sense the car moving through the array, row 310-3 may then be triggered, and then row 310-4 is triggered. When this particular activation sequence is detected, the camera will know that car 306 is quickly approaching from behind. In another scenario, row 310-4 may sense the car entering the array, row 310-3 may then sense the car moving through the array, row 310-2 may then be triggered, and then row 310-1 is triggered. When this particular activation sequence is detected, the camera will know that car 200 (i.e., the car on which the camera is mounted) is actually overtaking car 306 in the adjacent lane. In yet another scenario, car 306 may be sporadically moving around within array 308 (i.e., randomly triggering row 310-1 or row 310-4, which may indicate that car 306 is moving at approximately the same speed as car 200 and is hovering in the driver's blinds spot.

Still referring to FIG. 3, video frame 300 may also include an additional set of points 314 for detecting a car such as car 312 that is further back in adjacent lane 304. Points 314 may optionally be organized into multiple rows as described above to help determine the directionality of car 312. This might be helpful if car 312 is moving extremely quickly towards car 200, giving array 308 an even better chance at predicting the movement of an oncoming car in the adjacent lane.

Figure 4:
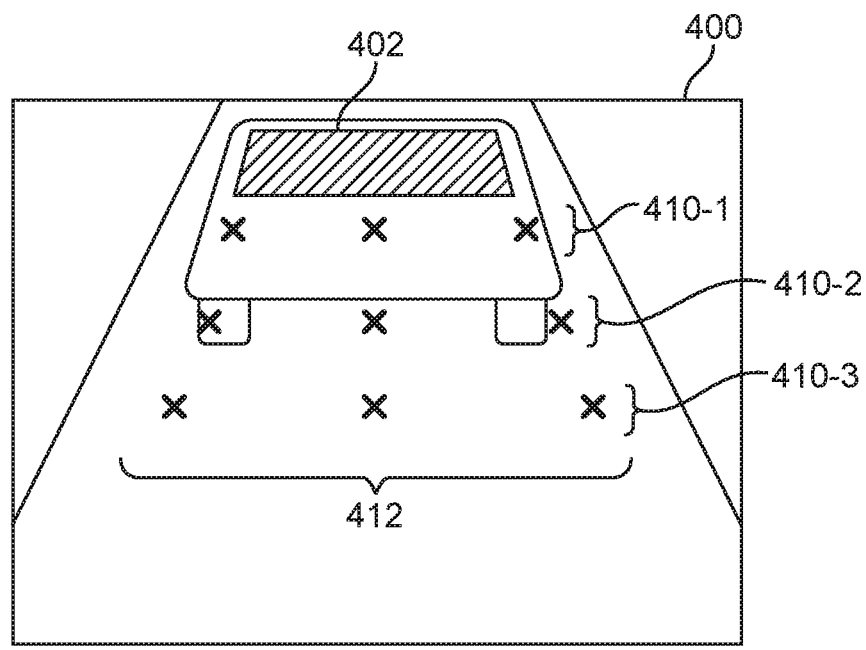
FIG. 4 is a diagram showing how a rearview camera can include multiple target points for rear collision detection accordance with an embodiment.

In some embodiments, it may also be desirable to detect the movement of a car such as car 320 directly behind car 200. FIG. 4 is a diagram showing how a video frame 400 captured by a rearview camera can include multiple target points for detecting rear collision. This particular camera may be mounted on the trunk, back bumper, or any other portion of the car's housing. As shown in FIG. 4, frame 400 may include an array of target points 412. In particular, array 412 may be divided into a first row of points 410-1, a second row of points 410-2, and a third row of points 410-3. Brightness or light intensity measurements can be taken at each of these target points. The intensity measurements can then be filtered using the long average filter to identify the road conditions and also filtered using the short average filter to identify "fast" moving object like cars that are quickly approaching from behind.

For example, a car such as car 402 may be detected in the same lane from behind. In one scenario, row 410-1 may sense the car entering the array, row 410-2 may then sense the car moving through the array, and row 410-3 may then be triggered. When this particular activation sequence is detected, the camera will know that car 402 is quickly approaching from behind, potentially risking a rear-end collision. In another scenario, array 412 may sense that the car is leaving array 402, which is indicative of car 402 either slowing down relative to the camera or changing into another lane. In yet another scenario, car 402 may be sporadically moving around within array 412 (i.e., randomly triggering row 410-1 or row 410-3, which may indicate that car 402 is moving at approximately the same speed as car 200 and is tailgating (and perhaps dangerously closely) from behind.

Figure 5:
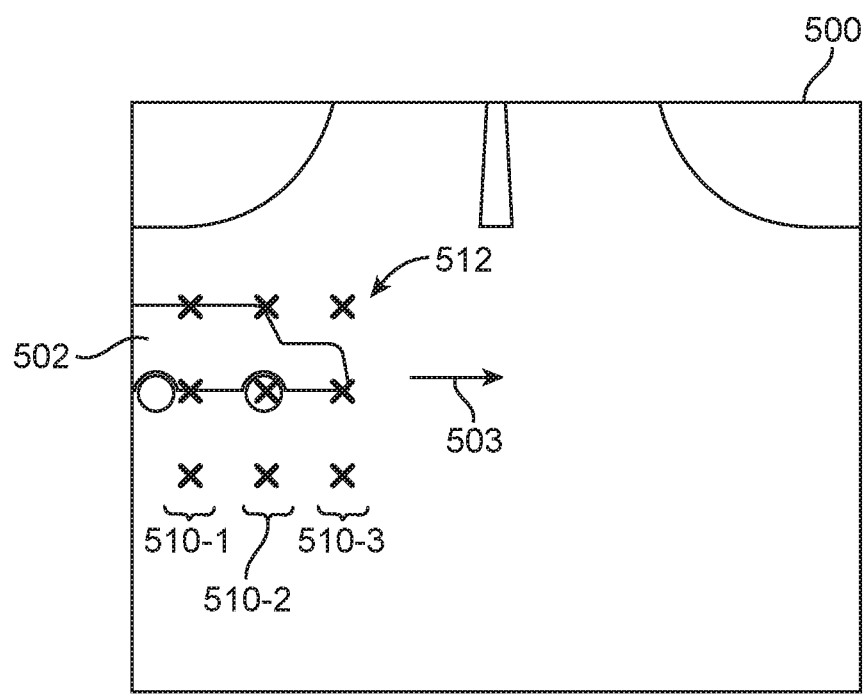
FIG. 5 is a diagram showing how a front-view camera can include multiple target points for cross traffic alert accordance with an embodiment.

In yet other suitable arrangements, it may also be desirable to detect the movement of a car moving across a lane from the front. FIG. 5 is a diagram showing how a video frame 500 captured by a rearview camera can include multiple target points for cross traffic alert. This particular camera may be mounted on the engine hood, front bumper, or any other portion of the car's housing. As shown in FIG. 5, frame 500 may include an array of target points 512. In particular, array 512 may be divided into a first column of points 510-1, a second column of points 510-2, and a third column of points 510-3. Brightness or light intensity measurements can be taken at each of these target points. The brightness measurements can then be filtered using the long average filter to identify the road conditions and also filtered using the short average filter to identify "fast" moving object like cars that are quickly moving from left to right or vice versa (from the driver's perspective).

For example, a car such as car 502 moving from left to right in the direction of arrow 503 may be detected. In this scenario, column 510-1 may sense the car entering the array, column 510-2 may then sense the car moving through the array, and column 510-3 may then be triggered. When this particular activation sequence is detected, the camera will know that car 502 is quickly moving from left to right. A similar array of target points (not shown) can also be included on the right portion of frame 500 to help detect a car that is quickly moving from right to left.

The exemplary configurations of target points shown in FIGS. 3-5 are merely illustrative and are not intended to limit the scope of the present embodiments. In general, automotive system 100 (FIG. 1) may include camera 102 for capturing video frames having any desired number of arrays of target points, where each array can include any suitable number of rows or columns of target points for sensing the movement of objects across the frame in any desired direction relative to system 100.

Figure 6:
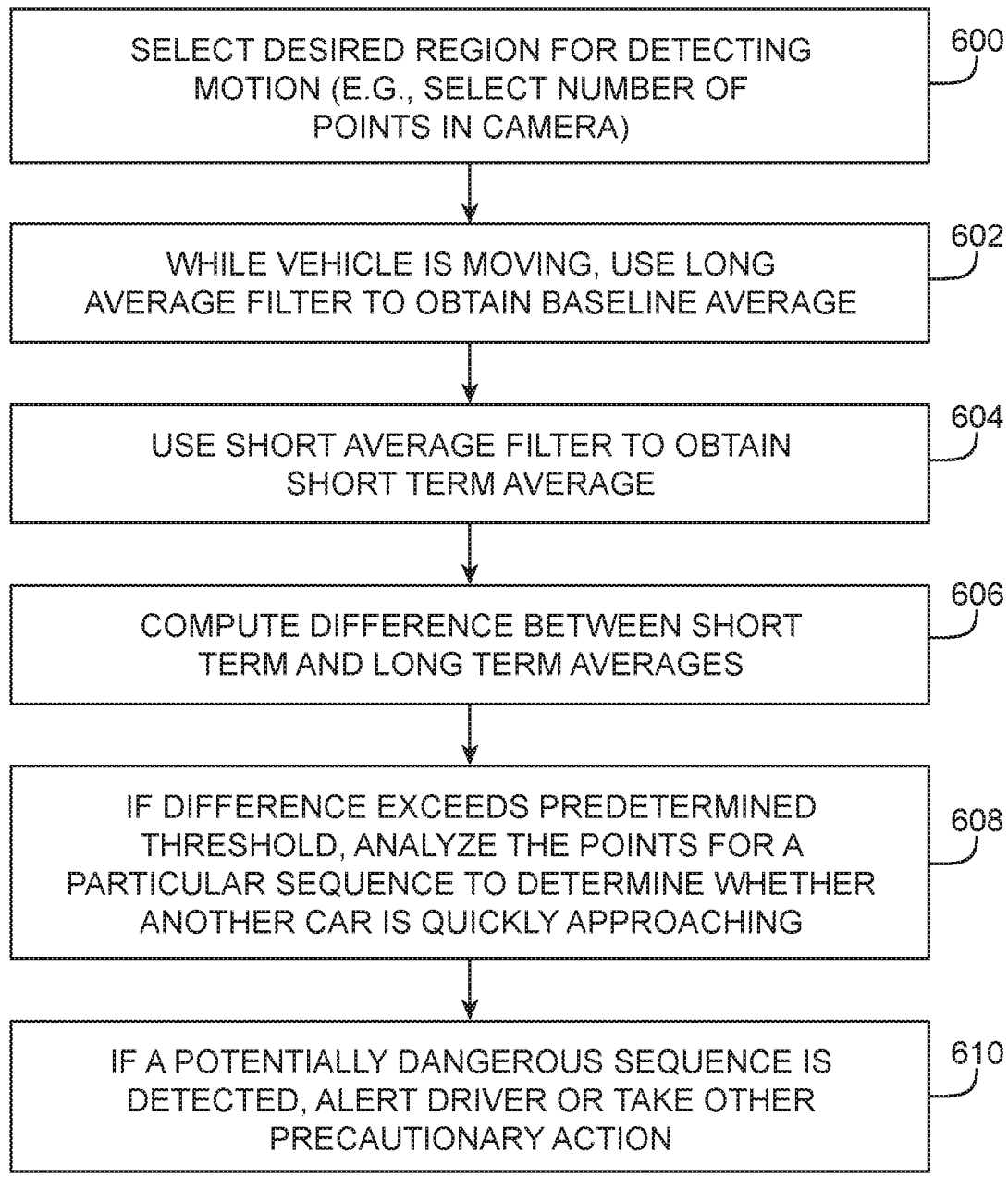
FIG. 6 is a flow chart of illustrative steps for operating a motion sensor on a car in accordance with an embodiment.

FIG. 6 is a flow chart of illustrative steps for operating a motion sensor such as camera 102 on car 100. At step 600, a desired region in the video frame may be selected for detecting motion (e.g., a number of points may be selected for measuring brightness levels in the camera). For example, a region of target points may be selected for detecting oncoming cars in an adjacent lane (see, e.g., FIG. 3). As another example, a region of target points may be selected for detecting rear-end collision (see, e.g., FIG. 4). As yet another example, a region of target points may be selected for detecting cross-traffic (see, e.g., FIG. 5).

At step 602, long average filter 104 may be used to obtain a baseline average measurement while car 100 is moving. The baseline average measurement serves to detect slow-changing road conditions or weather conditions (as examples).

At step 604, short average filter 106 may be used to obtain a short term average measurement while car 100 is moving. The short term average serves to detect fast-changing and potentially unsafe conditions, such as when a car or other external obstacles are moving towards car 100 at a fast pace (relative to the baseline measurements).

At step 606, a signal processor associated with the camera (e.g., a signal processor that may be part of the camera unit or may be a separate component) may compute the difference between the short term average measurement and the baseline average measure. If this computed difference exceeds a predetermined threshold level, the camera may determine whether the target points have been activated in a particular sequence (step 608).

If a potentially dangerous sequence has been detected, the camera may issue an alert to the driver and take other precautionary action (step 610). For example, if the camera detects that a car is quickly approaching from an adjacent lane, the camera may issue an alert to the driver so that the driver may decide not to change lanes or the car may actually prevent the driver from changing lanes (e.g., by mechanically locking the steering wheel so as to prevent a potential collision).

As another example, if the camera detects that a car is quickly approaching from behind, the camera may issue an alert to the driver so that the driver may somehow avoid the rear-end collision or if the collision is inevitable, the car may take other suitable action to minimize the impact (e.g., by applying brakes in a smart way so the car does not spin out of control or so that the car does not come to a sudden stop).

As yet another example, if the camera detects that a car is quickly approaching from an orthogonal lane (as in the intersection scenario shown in FIG. 5), the camera may again issue an alert to the driver so that the driver can somehow avoid entering the intersection out-of-turn or if the driver is unaware, the car may automatically apply brakes to prevent the car from entering the intersection.

These steps are merely illustrative. The existing steps may be modified or omitted; some of the steps may be performed in parallel; additional steps may be added; and the order of certain steps may be reversed or altered.

The embodiments described herein in which only two different filters are used to detect motion is merely illustrative and does not serve to limit the scope of the present invention. If desired, more than two filters may be used. In other suitable embodiments, at least three filters of different sensitivities may be used, at least four filters of different sensitivities may be used, at least five filters of different sensitivities may be used, etc.

The foregoing is merely illustrative of the principles of this invention and various modifications can be made by those skilled in the art. The foregoing embodiments may be implemented individually or in any combination.

What is claimed is:

1. An automotive system, comprising:
a camera configured to capture a frame for detecting motion in the vicinity of the automotive system, wherein:
the camera comprises processing circuitry configured to perform long average filtering to obtain a baseline average at only selected target points in the frame and to perform short average filtering to obtain a short term average at only the selected target points in the frame,
the selected target points comprise a subset of pixels that are selected in a predetermined blind spot region in the frame,
any one of the selected target points is activated when the short term average at that target point exceeds the long term average at that target point by a predetermined threshold, and
the processing circuitry is further configured to analyze a sequence in which the selected target points are activated to determine whether an external object is moving towards the automotive system or away from the automotive system.

2. The automotive system of claim 1, wherein the selected target points are organized into rows of target points that are not parallel to pixel rows in the frame.

3. The automotive system of claim 2, wherein the camera is further configured to determine that the external object is moving towards the automotive system in response to detecting that the rows of target points are activated in a first order and to determine that the external object is moving away from the automotive system in response to detecting that the rows of target points are activated in a second order that is different than the first order.

4. The automotive system of claim 1, wherein the camera further comprise an additional filter that is used to detection motion in the vicinity of the automotive system.

5. The automotive system of claim 1, wherein the predetermined blind spot region corresponds to a blind spot in an adjacent lane.

6. The automotive system of claim 1, wherein the predetermined blind spot region corresponds to a blind spot directly behind the automotive system.

7. The automotive system of claim 1, wherein the predetermined blind spot region corresponds to a region of interest in front of the automotive system.

8. A method for operating a camera in an automotive system, comprising:
using the camera to capture an image;
selecting a plurality of target sampling points in the image, the plurality of target sampling points comprising a subset of pixels that are selected in a predetermined blind spot region in the image;
with a long average filter, filtering measured intensity levels at only the plurality of target sampling points to generate a baseline average;
with a short average filter, filtering measured intensity levels at only the plurality of target sampling points to generate a short term average; and
sensing motion in the vicinity of the automotive system by comparing the short term average to the baseline average.

9. The method of claim 8, wherein sensing the motion in the vicinity of the automotive system comprises computing a difference between the baseline average and the short term average.

10. The method of claim 9, further comprising:
comparing the computed difference to a predetermined threshold to determine whether a given target sampling point in the plurality of target sampling points has been activated.

11. The method of claim 10, further comprising:
in response to detecting that the target sampling points are activated in a first sequence, determining that an external object is moving in a first direction; and
in response to detecting that the target sampling points are activated in a second sequence, determining that the external object is moving in a second direction that is different than the first direction.

12. A method for operating a camera mounted on a car to detect the motion of another car, comprising:
using the camera to capture video frames;
selecting an array of target points comprising a subset of pixels that are selected in a predetermined blind spot region in the video frames;
detecting an order in which the array of target points are activated;
in response to detecting that the array of target points are activated in a first order, determining that the another car is moving towards the camera; and
in response to detecting that the array of target points are activated in a second order that is different than the first order, determining that the another car is moving away from the camera.

13. The method of claim 12, further comprising:
using a long average filter in the camera to filter measured brightness levels at only the array of target points in each of the video frames; and
using a short average filter in the camera to filter measured brightness levels at only the array of target points in each of the video frames.

14. The method of claim 12, further comprising:
in response to determining that the another car is moving towards the camera, taking suitable precautionary action to prevent collision.

15. The method of claim 8, wherein the predetermined blind spot region corresponds to a blind spot in an adjacent lane.

16. The method of claim 8, wherein the predetermined blind spot region corresponds to a blind spot directly behind the automotive system.

17. The method of claim 8, wherein the predetermined blind spot region corresponds to a region in front of the automotive system.

18. The method of claim 12, wherein the predetermined blind spot region corresponds to a blind spot in an adjacent lane.

19. The method of claim 12, wherein the predetermined blind spot region corresponds to a blind spot directly behind the car.

20. The method of claim 12, wherein the predetermined blind spot region corresponds to a region in front of the car.

* * * * *